(12) United States Patent
Andersson et al.

(10) Patent No.: US 8,861,436 B2
(45) Date of Patent: Oct. 14, 2014

(54) METHOD AND APPARATUS FOR REDUCING INTERFERENCE IN A MOBILE COMMUNICATIONS NETWORK

(75) Inventors: Rutger Andersson, Kista (SE); Niilo Musikka, Bromma (SE); Fredrik Ovesjo, Alvsjo (SE); Patrik Karlsson, Alta (SE); Samuel Axelsson, Stocksund (SE); Lars O Martensson, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 405 days.

(21) Appl. No.: 13/000,526

(22) PCT Filed: Nov. 7, 2008

(86) PCT No.: PCT/SE2008/051274
§ 371 (c)(1),
(2), (4) Date: May 27, 2011

(87) PCT Pub. No.: WO2009/157836
PCT Pub. Date: Dec. 30, 2009

(65) Prior Publication Data
US 2011/0310795 A1 Dec. 22, 2011

Related U.S. Application Data

(60) Provisional application No. 61/074,769, filed on Jun. 23, 2008.

(51) Int. Cl.
*H04W 4/00* (2009.01)
*H04W 72/12* (2009.01)

(52) U.S. Cl.
CPC ...... *H04W 72/1231* (2013.01); *H04W 72/1268* (2013.01)
USPC ........................................................ 370/328

(58) Field of Classification Search
CPC .... H04B 7/0491; H04W 16/02; H04W 16/12; H04W 16/24; H04W 72/0453; H04W 16/14; H04W 24/08; H04W 24/10; H04W 52/146; H04W 52/247; H04W 52/40; H04W 52/44; H04W 60/00; H04W 72/005; H04W 72/04
USPC ........................... 370/254–350; 455/450, 451
See application file for complete search history.

(56) References Cited

U.S. PATENT DOCUMENTS 6,198,730 B1 * 3/2001 Hogberg et al. .............. 370/320
7,839,830 B2 * 11/2010 Sang et al. .................... 370/337
(Continued)

FOREIGN PATENT DOCUMENTS

CN 1600005 A 3/2005
CN 101141779 A 3/2008

OTHER PUBLICATIONS

International Search Report, PCT/SE2008/051274, Apr. 23, 2009.
(Continued)

*Primary Examiner* — Ayaz Sheikh
*Assistant Examiner* — Debebe Asefa
(74) *Attorney, Agent, or Firm* — Myers Bigel Sibley & Sajovec, P.A.

(57) ABSTRACT

The invention relates to a method for reducing interference between users in a mobile communications network (1) in which uplink transmissions from user equipment, UE (3), to a radio base station, RBS (5A, 5B), can be performed on at least two different carriers (C1, C2). The UE (3) support dynamic switching between CDM and TDM transmission mode and the RBS (5A, 5B) is arranged to dynamically set the mode of transmission for the UE (3). The method comprises the steps of: —identifying (S200) at least a first UE as a high data rate, HDR, UE currently requiring high data transmission rate; dedicating (S201) at least one of said at least two carriers (C1, C2) to said HDR UE for at least a first period of time (T), said at least one carrier (C1, C2) hereinafter being named clean carrier, and—allocating (S202) said at least first HDR UE to said clean carrier (C1, C2) during said at least first period of time (T). This method ensures that no UE operating in CDM mode is transmitting on the same carrier at the same time as the HDR UE.

18 Claims, 7 Drawing Sheets

(56) References Cited

U.S. PATENT DOCUMENTS

| | | | |
|---|---|---|---|
| 8,145,229 B1* | 3/2012 | Mansour | 455/452.2 |
| 2007/0091786 A1 | 4/2007 | Li et al. | |
| 2009/0268675 A1* | 10/2009 | Choi | 370/329 |

OTHER PUBLICATIONS

Written Opinion of the International Searching Authority, PCT Application No. PCT/SE2008/051274, Apr. 23, 2009.

Ericsson: "Requirements for E-DCH TDM support" 3GPP TSG RAN WG1 Meeting #52 Feb. 15, 2008, Retrieved from the Internet: URL:http://74.125.77.132/search?q=cache:3E12_ItsLcUJ:www.quintillion.co.jp/3GPP/TSG_RAN/TSG_RAN2008/TSG_RAN_WG1_RL1_2.html+tr-25.823+3gpp&cd=1&hl=n1&ct=clnk&gl=n1>.

Chinese First Office Action Corresponding to Chinese Patent Application No. 200880129920.6; Issuing Date: Jan. 14, 2013; Foreign Text, 5 pages, English Translation Thereof, 3 Pages.

\* cited by examiner

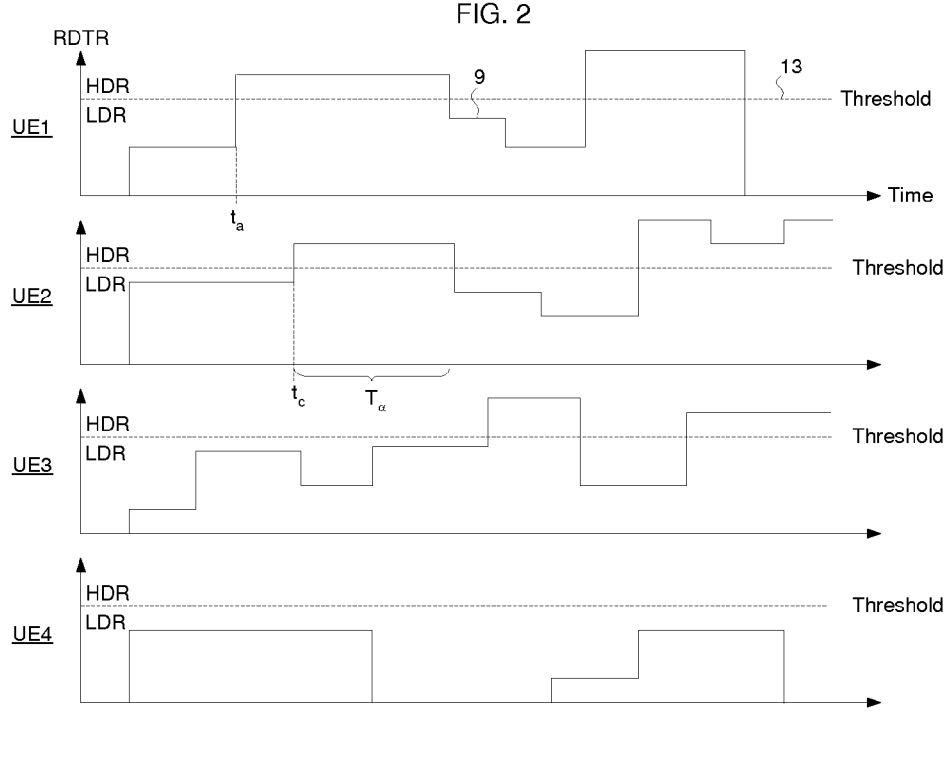
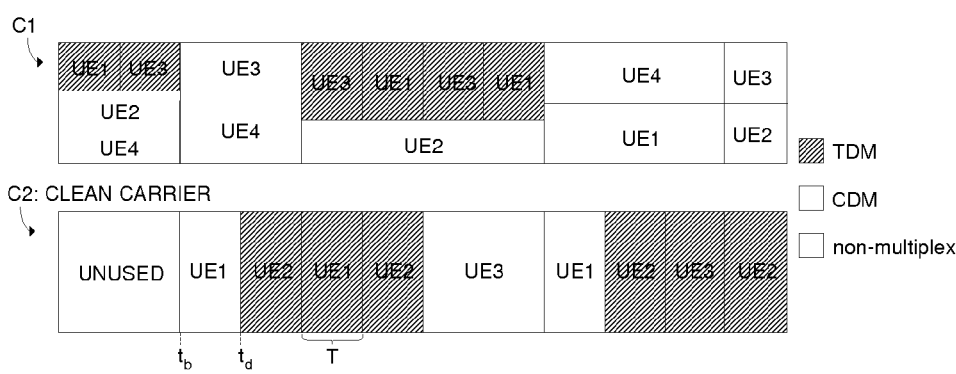
FIG. 2

|   | Non-clean carrier | Clean carrier |
|---|---|---|
| L1 signalling parameters: | | |
| A → Carrier | C1 | C2 |
| B → cleanCarrierFlag | 0 | 1 |
| C → Grants | 1 Mbps | 2Mbps |
| Used Grants: | | |
| D → Service 1+2 | 1 Mbps | - |
| Service 2 | - | 2Mbps |
| E → L1 signalling at TDM timeout | ON | OFF |

METHOD AND APPARATUS FOR REDUCING INTERFERENCE IN A MOBILE COMMUNICATIONS NETWORK

CROSS REFERENCE TO RELATED APPLICATION

This application is a 35 U.S.C.§371 national stage application of PCT International Application No. PCT/SE2008/051274, filed on 7 Nov. 2008, which claims priority to U.S. Provisional Application No. 61/074,769 filed 23 Jun. 2008, the disclosures and content of which are incorporated by reference herein in their entireties. The above-referenced PCT International Application was published in the English language as International Publication No. WO 2009/157836A1 on 30 Dec. 2009.

TECHNICAL FIELD

The invention presented herein relates to the field of mobile communications networks, and in particular to a method and system for reducing interference in mobile communications networks.

BACKGROUND

In WCDMA (Wideband Code Division Multiple Access) networks based on 3GPP (Third Generation Partnership Project) rel-7 and earlier, one user equipment (UE) receives and transmits data on one carrier frequency only.

Due to non-orthogonality between users, resulting in interference leakage between them, the system throughput for uplink is limited to 2-3 Mbps in scenarios with multiple users. 3GPP has specified support for uplink user rates of 6-12 Mbps in a system. This means that the aim 1s to have user experience of high throughput at low load.

Multicarrier WCDMA has been proposed in 3GPP, meaning simultaneous transmission to/from one UE on many carriers (3GPP TR-25.814). The aim 1s to achieve optimal load balancing over many carriers.

Support of a time division multiplexing (TDM) scheduling mode in uplink has also been proposed in 3GPP TR-25.823.

A network operator can classify a user as High Data Rate (HDR) user or Low Data Rate (LDR) user, according to its data rate need. Based on this, 3GPP rel-7 does not prevent the introduction of interference cancellation (IC) in uplink for HDR users to reduce interference for LDR users. The aim 1s however to experience high throughput also with multiple HDR users. This requires IC also between HDR users, which is costly.

An alternative solution is to introduce TDM scheduling on uplink, meaning that IC only has to be performed on one HDR user at a time. To be efficient TDM scheduling should only be used when the scheduled user can fully utilize allocated TDM resources. The fraction of the traffic not able to fully utilize allocated TDM resources should therefore remain in code division multiplexing (CDM) mode. Dynamic switching between CDM mode and TDM mode may be done based on knowledge of buffer status in the UE. This mixture of TDM and CDM modes within a carrier may also be applied to the multicarrier concept, thus one user can transmit data on many carriers simultaneously, using either CDM or TDM mode on each carrier. L1 signalling may be used by the network to send individual access grants in order to control the allowed uplink rate for each user and carrier.

In the existing solution, LDR traffic in CDM mode is mixed with HDR users in TDM mode, on which IC is applied. The stability of this solution is questionable due to the following:

High variation of IC efficiency on TDM scheduled HDR users.

High data rate variation between TDM scheduled HDR users.

High absolute power variation on TDM scheduled HDR users due to power control.

This creates an unstable and fluctuating radio environment for LDR users in CDM scheduled mode. This may result in higher required Signal-Interference Ratio (SIR) for the LDR traffic, meaning lower capacity. Maintaining the Quality of Service (QoS) for LDR users, also for LDR users with high SIR, will be more difficult. In order to keep these fast radio fluctuations under control, the rate of the HDR users have to be set conservatively and thereby eliminating the goal of high data rates by means of TDM scheduling in combination with IC.

Furthermore even if IC is applied within a cell it can not reduce the inter-cell interference, which will further limit possibility for higher data rates in the system. More advanced IC techniques can be used to deal with this, but it can only reduce interference from very few users in neighbour cells.

A problem addressed by the invention is thus to overcome or at least mitigate at least one of the above-indicated difficulties.

SUMMARY

The above-indicated problem is solved by a method for reducing interference between users in a mobile communications network in which uplink transmissions from user equipment (UE) to a radio base station (RBS) can be performed on at least two different carriers. The UE support dynamic switching between CDM and TDM transmission mode and the RBS is arranged to dynamically set the mode of transmission for the UE. The method comprises the steps of:

identifying at least a first UE as a high data rate (HDR) UE currently requiring high data transmission rate;

dedicating at least one of said at least two carriers to said HDR UE for at least a first period of time, said at least one carrier hereinafter being named clean carrier; and allocating said at least first HDR UE to said clean carrier during said at least first period of time, thereby ensuring that no UE operating in CDM mode is transmitting on the same carrier as said HDR UE during said period of time.

Dedicating a carrier to a UE herein means that this particular UE is the only UE allowed to transmit on that carrier. By dedicating a carrier to a HDR user, one can assure that there are no users simultaneously transmitting in CDM mode on that carrier. Thus, the HDR user can be allowed to transmit at high data rates on the clean carrier without causing any interference towards low data rate (LDR) users operating in CDM mode.

Typically, there will be more than one HDR user within available carriers. When a plurality of UE are identified as HDR UE and allocated to the same clean carrier, they are scheduled in TDM mode, thereby assuring that only one HDR UE at a time transmits on each clean carrier.

Thus, according to one aspect of the invention, all UE within available carriers are divided into two groups: HDR UE and LDR UE. The HDR UE are scheduled in TDM mode on one or several clean carriers whereas the LDR UE may be scheduled in either CDM or TDM mode on one or several non-clean carriers.

Thus, the above-indicated problem is solved by taking the concept of multicarrier into account; the uplink HDR users are allocated on separate carrier(s) on uplink, herein named clean carrier(s), where they are scheduled in TDM mode. On these clean carriers there are no users scheduled in CDM mode.

By allocating HDR users to clean carriers and scheduling them in TDM mode, low data rate (LDR) users transmitting on non-clean carriers will not experience any interference caused by HDR users. That is, there is no longer any intra-cell disturbance from HDR users towards LDR users and the stability problem of existing solutions discussed above is therefore to a large extent solved. By using the proposed method, much higher noise rise can be allowed within a cell, resulting in a much higher experienced data rate for HDR users. Additionally, for a clean carrier, no interference cancellation (IC) for intra-cell interference reduction is needed, leading to reduced system complexity.

Another advantage of the proposed method is that it also provides for better inter-cell interference control. This is due to the fact that the neighbouring cells of a cell employing the proposed clean-carrier concept will experience fewer HDR users as interferers. This makes it possible for an advanced IC receiver to efficiently reduce the inter-cell interference.

According to an aspect of the invention, the allocation of HDR users to clean carrier(s) may be dynamic. Dynamic allocation of HDR users to/from the clean carrier(s) may be performed by means of L1 signalling, which signalling for example may be performed on an enhanced dedicated channel (E-DCH) absolute grant channel (E-AGCH).

According to yet another aspect of the invention, a specific service can be chosen not to be used on a clean carrier, meaning that data related to some services are allowed to be transmitted on a clean carrier while data related to other services are not. By allowing data related to a particular service to be transmitted both on non-clean and clean carriers (making that service what herein is referred to as a clean-carrier service), one can assure that data related to that service can be transmitted at a high rate without causing significant disturbance for low data rate transmissions. Also, by allowing different services to be allocated either only to non-clean carriers of both to non-clean and clean carriers, the environment for each carrier can be customized depending on the required Quality of Service (QoS) of the services transmitted on that carrier.

According to other aspects of the invention the above-indicated problem is solved with communication nodes for engaging in the above-indicated clean carrier procedure.

In particular, the problem is solved by an RBS node comprising means for performing the steps according to the method described above.

According to another aspect, a Radio Network Controller (RNC) node or the like can engage in the clean carrier procedure by preparing the UE for clean-carrier operation. This can be done by means of Radio Resource Control (RRC) signalling at Radio Bearer setup/reconfiguration.

BRIEF DESCRIPTION OF THE DRAWINGS

The present invention will become more fully understood from the detailed description provided hereinafter and the accompanying drawings which are given by way of illustration only. In the different drawings, same reference numerals correspond to the same element.

FIG. 2 illustrates a way of allocating user equipment (UE) to/from a clean carrier according to an embodiment of the invention.

ACRONYMS AND ABBREVIATIONS

| Acronym | Definition |
|---|---|
| 3GPP | Third Generation Partnership Project |
| CDM | Code Division Multiplexing |
| DPCCH | Dedicated Physical Control Channel |
| E-AGCH | Enhanced dedicated channel Absolute Grant Channel |
| E-DPCCH | Enhanced Dedicated Physical Control Channel |
| E-DPDCH | Enhanced Dedicated Physical Data Channel |
| HDR | High Data Rate |
| HS-DPCCH | High Speed Dedicated Physical Control Channel |
| IC | Interference Cancellation |
| L1 | Layer one |
| LDR | Low Data Rate |
| MC | Multicarrier |
| NBAP | Node B Application Part |
| QoS | Quality of Service |
| RDTR | Requested Data Transmission Rate |
| RRC | Radio Resource Control |
| SIR | Signal-Interference Ratio |
| TDM | Time Division Multiplexing |
| UE | User Equipment |
| WCDMA | Wideband Code Division Multiple Access |

DETAILED DESCRIPTION

Various exemplary embodiments of the invention will now be described. The embodiments will be illustrated in a HSPA (High Speed Packet Access) scenario. The invention is, however, not limited to HSPA, and the teachings of the invention may be applied to any system or standard where the same or similar problems need solving.

In a network scenario a number of HSPA users are configured in a sector to operate in MC (Multicarrier) mode on multiple cell carriers in uplink.

A sector should herein be interpreted as the geographical area covered by an RBS. The meaning of the term cell as used in this document is defined in 3GPP TS 25.401 in which it is defined as a radio network object that can be uniquely identified by a UE from a cell-identification that is broadcasted over a geographical area from one RBS. More simply, in the present context, the term cell can be construed as a logical concept for a carrier (or carrier frequency), which carrier therefore may be referred to as cell carrier. A sector in which users operate in MC mode thus comprises a plurality of logical cells corresponding to the different carriers to which users in the sector are allocated.

Figure 1:
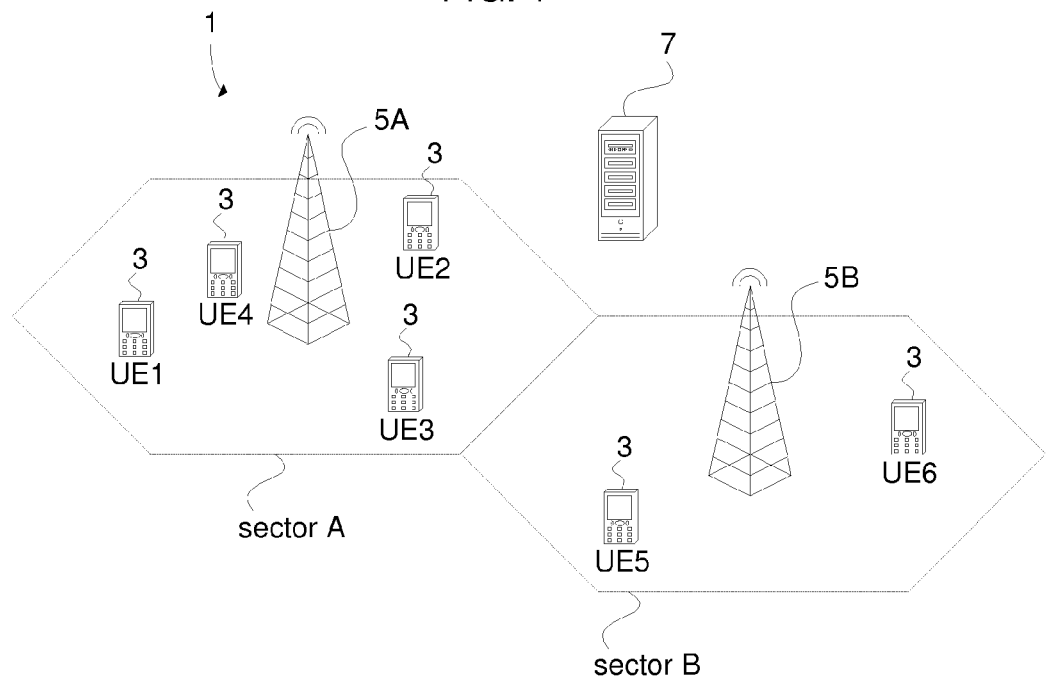
FIG. 1 illustrates a mobile communications network in which the invention is applicable.

FIG. 1 illustrates a network 1, such as a UMTS network, having a plurality of sectors of which only two are shown in the drawing, namely sector A and sector B. Each sector houses a Radio Base Station (RBS) 5A, 5B, such as a Node-B, to which User Equipment (UE) 3 can connect to communicate with each other and other network nodes as well known in the art. The network further comprises a network node 7, such as a Radio Network Controller (RNC), for controlling the RBSs 5A, 5B and for setting up and specifying the communication links between the RBSs and the UE 3.

The UE 3 is arranged to operate in MC mode, meaning that uplink transmissions from the UE 3 to the RBSs 5A, 5B can be performed on at least two different carrier frequencies, hereinafter referred to as just carriers. For example, the uplink carriers can be two or more adjacent 5 MHz intervals in the 1900 MHz frequency band. Thus, a carrier should typically, in this context, be considered a bandwidth of frequencies. Moreover, the UE 3 is arranged to support transmission in both Code Division Multiplexing (CDM) and Time Division Multiplexing (TDM) mode. Each RBS 5A, 5B is arranged to allocate the transmissions of the UE 3 in its sector to available cell carriers and to control the mode of transmission for the UE 3 on each carrier. The UE 3 may be adapted to support simultaneous transmission on two or more carriers but it should be appreciated that the inventive concept presented herein is applicable also if the UE 3 support transmission only on one carrier at a time.

The UE 3 can be either High Data Rate (HDR) UE or Low Data Rate (LDR) UE, depending on their current data rate need. In this scenario, in order to avoid interference from HDR users towards LDR users, the HDR users should be isolated from the LDR users. In one embodiment this is achieved by allocating all HDR users to a carrier, herein named clean carrier, where they are scheduled in TDM mode. On this clean carrier there are no LDR users operating in CDM mode. The HDR users are that way not generating any intra-cell interference with regard to the LDR users, allowing the HDR users to work at much higher noise rise level and thereby have possibility to use maximum data rates as specified by 3GPP. A clean carrier should herein be interpreted as a carrier on which no UE are allowed to transmit in CDM mode.

Thus, according to the proposed principle, all UE within available carriers are divided into two groups: HDR UE and LDR UE. The HDR UE are scheduled in TDM mode on clean carriers whereas the LDR UE may be scheduled in either CDM or TDM mode on the non-clean carriers.

FIG. 2 illustrates four graphs showing requested data transmission rates (RDTR) 9 over time for the four UE UE1-UE4 located in sector A in FIG. 1, and two cell carriers C1, C2 illustrating how the UE UE1-UE4 may be allocated to the available cell carriers C1, C2 in dependence of their alternating data rate need according to an embodiment of the invention.

Typically, the UE UE1-UE4 sends data rate requests, or, in another word, requests for grant, to the RBS 5A in dependence of their current buffer size, i.e. they request permission to transmit data at a rate which depends on the amount of data waiting to be transmitted by each UE UE1-UE4. In response thereto, the RBS 5A allocates the UE to one or several carriers C1, C2 and grants transmission at a particular rate and in a particular mode of transmission on said carrier(s).

The RBS 5A is further adapted to identify each UE UE1-UE4 as either an HDR UE or an LDR UE. This may be done, e.g., based on the received data rate requests. For example, the RBS 5A may be arranged to identify a UE as a HDR UE if the RDTR 9 received from that UE exceeds a certain threshold value, illustrated by the dashed lines 13 in FIG. 2.

Now turning to the illustration of the carriers C1, C2, it is seen that the UE UE1-UE4 may be dynamically scheduled in TDM mode (hatched boxes), CDM mode (white boxes) or a non-multiplexed mode (dotted boxes). As well known in the art there exist various versions of TDM and CDM and it should be appreciated that the invention is not limited to any particular one of them. The non-multiplexed mode is a mode that is neither TDM mode nor CDM mode. The non-multiplexed mode may be used for a UE being allocated for an indefinite time to a carrier on which there are no other transmitting UE. The height of each box within the carriers C1, C2 is intended to symbolize the transmission rate currently granted for a certain UE UE1-UE4 on that carrier by the RBS 5A. Although illustrated that way, it should be appreciated that the sum of the transmission rates simultaneously granted on each carrier C1, C2 does not have to be constant over time.

In this embodiment, one of the cell carriers, namely carrier C2, is permanently used as clean carrier. When no UE within the available cell carriers are identified as a HDR UE by the RBS 5A, the clean carrier C2 is unused. However, when a UE can be identified as a HDR UE, the RBS 5A dedicates the clean carrier C2 to the HDR UE and allocates the HDR UE to said clean carrier. Dedicating a carrier to a UE herein means that this particular UE is the only UE allowed to transmit on that carrier, at least for a certain period of time. As will be described in more detail later on, the step of dedicating a carrier to a UE does not necessarily require any action to be taken (if the carrier is already a clean carrier). However, dedicating a carrier to a UE may also involve the step of aborting transmissions for UE currently transmitting on that carrier and/or reallocating UE currently transmitting on that carrier to other carrier(s).

From FIG. 2 it is seen that, during a first period of time preceding a point in time $t_a$, no UE is identified as a HDR UE and the permanent clean carrier C2 is unused. At the point in time $t_a$, however, the RDTR 9 of UE1 rises above the threshold value 13, making the RBS 5A (see FIG. 1) identify UE1 as an HDR UE. Since there are no other UE transmitting on C2 at that point in time, no actions have to be taken by the RBS 5A in order to dedicate C2 to UE1. The RBS 5A then allocates UE1 to the clean carrier C2 at a point in time $t_b$ subsequent to $t_a$. Since there are no other UE being identified as HDR UE at the point in time $t_b$ at which UE1 is allocated to the clean carrier, the RBS 5A typically schedules UE1 in non-multiplexed mode on the clean carrier. At a point in time $t_b$, the RDTR of UE2 also rises above the threshold value 13, making both UE1 and UE2 HDR UE during a time period $T_\alpha$. At a point in time $t_d$ subsequent to $t_b$, the RBS 5A allocates UE2 to the clean carrier C2 and schedules both UE1 and UE2 in TDM mode on C2. Thereby, UE1 and UE2 are allowed to transmit at high data rates without causing any interference towards LDR users in CDM mode, as there are no users in CDM mode on the clean carrier C2, and without causing any interference towards each other as they are scheduled in TDM mode and hence transmits at different points in time. That is, if only a single UE within the available carriers is identified as a HDR UE, the RBS 5A typically schedules the single HDR UE in non-multiplexed mode on the clean carrier, whilst, if a plurality of UE are simultaneously identified as HDR UE and allocated to the same clean carrier, they are scheduled in TDM mode.

The shortest time for which a HDR UE is allowed to transmit on the clean carrier C2 is limited by the length of a TDM timeslot, denoted by reference numeral T in FIG. 2. The length of a TDM timeslot is typically in the order of some milliseconds. Although illustrated as scheduled into a TDM mode allowing UE1 and UE2 to transmit only for one TDM timeslot at a time from the point in time $t_d$, it should be appreciated that this is merely an example of TDM scheduling and that the TDM timeslots available on the clean carrier may be distributed among the HDR UE in dependence of their data rate requirements.

As also seen in FIG. 2, a sole UE may be allocated to more than one carrier simultaneously, in which case it may be scheduled in the same mode or in different modes on the different carriers. As mentioned above, however, this requires that the UE is adapted for simultaneous transmission on multiple carriers.

The basic principle of giving a UE requiring high data rate (i.e. a HDR UE) the sole right to transmit on a carrier (i.e. a clean carrier) for at least a certain period of time, and allowing said UE to transmit at a high data rate on said carrier during that period of time, allows users to experience high data rates without increasing interference towards UE transmitting in CDM mode.

Figure 3:
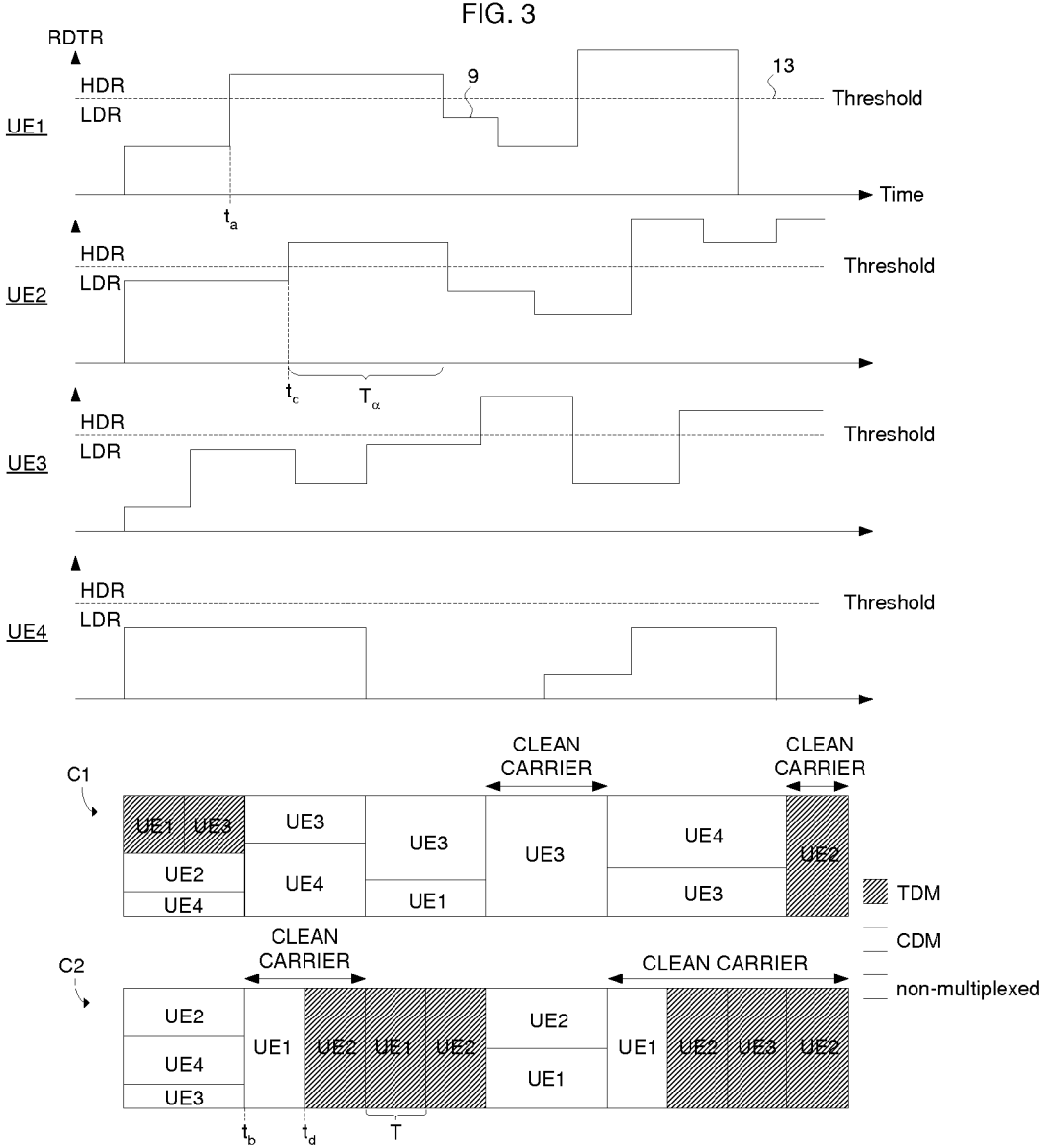
FIG. 3 illustrates another way of allocating UE to/from a clean carrier according to the invention.

FIG. 3 illustrates how the four UE UE1-UE4 located in sector A in FIG. 1 may be allocated to the available cell carriers C1, C2 in dependence of their alternating data rate need according to another embodiment of the invention.

While the four RDTR graphs showing RDTRs 9 over time for UE1 to UE4 are identical to the RDTR graphs in FIG. 2, the allocation of the UE1, UE2, UE3 and UE4 to the cell carriers C1, C2 differs substantially from that shown in FIG. 2.

In this embodiment, none of the carriers C1, C2 are permanently used as a clean carrier. Instead, clean carriers are dynamically established and released and HDR users are dynamically allocated to/from the clean carriers while they are established.

Dynamic establishment and release of clean carriers is advantageous in that all carriers, i.e. all available bandwidth, can be utilized also when no UE within the available carriers is identified as a HDR UE. It is also advantageous in that a carrier previously used as a non-clean carrier can be made a clean carrier if, e.g., the number of LDR users in the available carriers decreases while there are still HDR users waiting to be allocated to a clean carrier. At any given point in time, any, all, or none of the available cell carriers C1, C2 can be used as a clean carrier depending on the data rate needed by the different UE UE1-UE4 within the available carriers at that point in time.

Although the embodiments illustrated in FIGS. 2 and 3 illustrate the use of two cell carriers C1, C2, it should be understood that the inventive clean-carrier concept is applicable also when using more than two carriers. For example, in both embodiments, there may be three cell carriers of which two are defined as clean carriers whereas one is not. Thus there could be several clean carriers defined simultaneously within the MC capable cell-carriers in a sector. A specific user can simultaneously be allocated to any number of these clean carriers.

According to one aspect of the invention, data related to a specific service are allowed to be transmitted on a clean carrier while data related to another service are not. By allowing data related to a particular service to be transmitted on a clean carrier, or, in other words, making a particular service a "clean-carrier service", one can assure that data related to that service can be transmitted at a high rate without causing significant disturbance for low data rate transmissions.

Some of the services of a HDR user may be allocated to clean carriers, while other services for the same user, may simultaneously work on non-clean carriers. The environment for each carrier can that way be customized depending on the required Quality of Service (QoS) of the services transmitted on the carrier, e.g. a more aggressive environment can be applied on clean carriers resulting in higher data rates but more retransmissions and higher latency.

The dynamic establishment and release of clean carriers and the dynamic allocation of HDR users and/or services to/from these clean carriers can be performed by means of L1 signalling. In one embodiment, the existing E-DCH Absolute Grant Channel (E-AGCH) may be modified for these new signalling needs. From existing solution it is assumed that the L1 signalling is including information about granted rate for a certain carrier. Additionally a new information element is needed per carrier, indicating if the grant is for a carrier working in clean carrier mode. This could be implemented by means of a flag i.e. cleanCarrierFlag, where cleanCarrierFlag=1 indicates clean carrier and cleanCarrierFlag=0 indicates non-clean carrier. In one embodiment, from Radio Resource Control (RRC) signalling at Radio Bearer setup/reconfiguration, it is defined to UE which services are allowed to be scheduled on a clean carrier. When a user receives a grant with cleanCarrierFlag=1 it may be applied to services for which clean carrier is allowed. A received grant with cleanCarrierFlag=0 may be applied to all services.

Figures 4, 5:
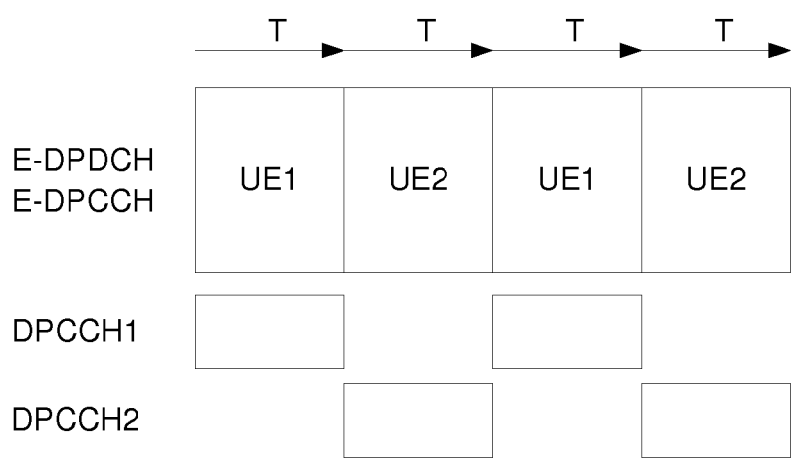
FIG. 4 illustrates an example of L1 signalling at allocation of a user to a clean and non-clean carrier.
FIG. 5 shows an example of two multi-carrier users being scheduled in TDM mode on a clean carrier.

FIG. 4 shows an example of L1 signalling at allocation of a user to a clean carrier C2. Also L1 signalling to the same user on a non-clean carrier C1 is shown. In the RRC signalling, Service 1 has been excluded from usage on clean carrier. Also, RRC signalling has excluded L1 signalling at TDM timeout for clean carrier, a feature which will be described in more detail below. The example shows a case of two carriers and two services, although both the number of carriers and the number of services can be expanded.

That is, the information D indicating which services are allowed to be transmitted on clean and non-clean carriers, respectively, can be sent from the RNC 7 (see FIG. 1) to the UE 3 using RRC signalling at Radio Bearer setup/reconfiguration. So can the information E indicating whether L1 signalling should be allowed at TDM timeout.

Thus, according to this exemplary signalling scheme, only the information A identifying the available carriers C1 and C2, the information B indicating which of the available cell carriers is/are clean carrier(s), and the information C stating the allowed transmission rate for each carrier is sent from the RBS 5A, 5B to the UE 3 using L1 signalling. Preferably, yet another L1 signalling parameter (not shown) indicating the period of time for which a grant is given is also transmitted to the UE if the UE is to be scheduled in TDM mode. This parameter will be discussed in greater detail with reference to FIG. 6 below.

In one embodiment, when a UE is allocated in MC mode with a mix of clean carrier(s) and non-clean carrier(s), for the services having grants on both clean carrier(s) and non-clean carrier(s), the UE should start scheduling these services on the clean carrier(s) and in the order of allocated grant per clean carrier. The services should be scheduled in service priority order.

In one embodiment, when a UE is allocated in MC mode and, for a particular carrier, receives a grant with cleanCarrierFlag=1, meaning allocation to a clean carrier, it should configure all its HS-DPCCH (High Speed Dedicated Physical Control Channel) channels to a non-clean carrier when scheduled in TDM mode. During TDM scheduling on clean carrier, the HS-DPCCH of a non-transmitting user would otherwise be heavily disturbed by TDM transmission from the transmitting user.

Now, the concept of excluding L1 signalling at TDM timeout will be described. Normally, in known versions of TDM, a UE that is scheduled in TDM mode on a carrier only interrupts the data transmission during TDM timeslots for which it has not received a grant, while L1 signalling never is interrupted. In one embodiment of the invention, there is support for an optional behavior of the UE. At TDM timeout, the UE would then instead autonomously totally shut off its uplink transmission on the clean carrier, including L1 signalling. The reason is that at clean carrier operation, the L1 signalling of the non transmitting users will not be usable, as they are heavily disturbed by TDM transmission from the transmitting user. Therefore in order to save capacity it should be possible to shut them off. In one embodiment this behaviour can be signalled on L1 using the cleanCarrierFlag as described above. From RRC signalling at Radio Bearer setup/reconfiguration the UE behavior after TDM timeout is defined for a clean carrier/non-clean carrier. When a UE receives a grant cleanCarrierFlag=1 it may shut off L1 transmission after TDM time out. Excluding L1 signalling at TDM timeout thus means that not even L1 signalling is allowed during time periods for which that UE has not received a grant for TDM transmission. When the term transmission is used in this document, it should be understood that it refers to data transmission and not L1 signalling unless explicitly stated otherwise.

FIG. 5 illustrates the above-described concept of exclusion of L1 signalling at TDM timeout. The drawing illustrates an example of two MC users being scheduled in TDM mode on a clean carrier, on which they are allowed to transmit for a time period T at a time. From RRC signalling L1 signalling of DPCCH has been excluded after TDM timeout. Here, it is seen that UE1 and UE2 are adapted to autonomously totally shut off their uplink transmission on the clean carrier at TDM timeout, including L1 signalling on DPCCH. By prohibiting L1 signalling by UE1 in the second and fourth TDM timeslot, and L1 signalling by UE2 in the first and third timeslot, valuable capacity is saved. Thus, this optimized TDM scheduler scheme can be used for clean carrier(s) to further save capacity within the cell carrier.

Some of the above features require that the UE within the available cell carriers has knowledge of which cell carrier(s) is/are clean. As mentioned above, this knowledge can be provided to the UE by using the proposed cleanCarrierFlag-parameter B. It should, however, be appreciated that the proposed clean-carrier concept is not limited to the use of the cleanCarrierFlag-parameter and that the concept can be beneficially used without the UE knowing which carrier is clean and which is not.

In one embodiment of TDM scheduling, the scheduling is performed by simultaneously sending Grant=0, i.e. a grant of 0 Mbps, to one user and an active grant to another user. However, simultaneous signalling to two different TDM users should be avoided, since the reception of Grant=0 can fail, resulting in simultaneous TDM transmission from the two users and thereby instability. There can also be overlap between two TDM transmissions, due to misalignment between users. Therefore, in one embodiment of the present invention, a new type of TDM scheduling is proposed. According to this new type of TDM scheduling, a grant should be given to a user for a certain time period. At TDM timeout, thus if not a new grant arrives within this time period, the UE will autonomously set its granted rate to 0.

Figure 6:
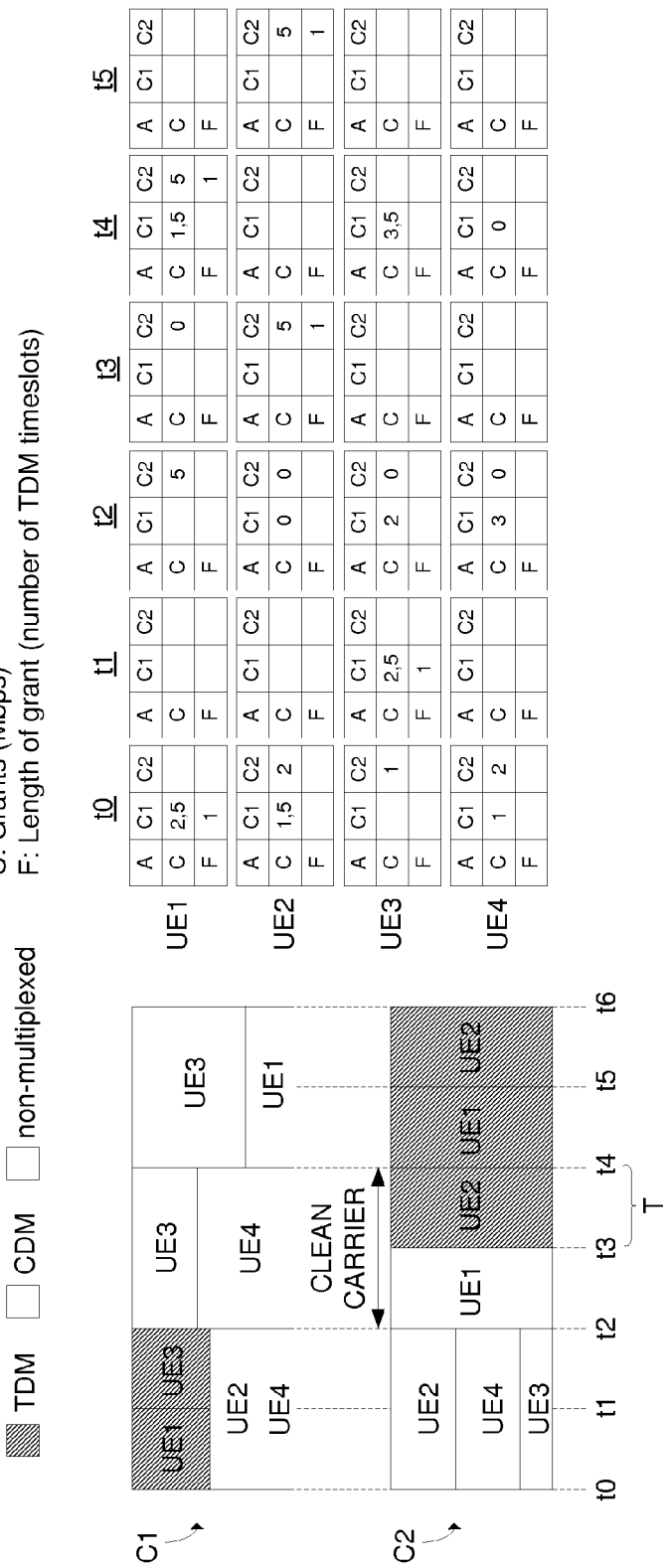
FIG. 6 illustrates an embodiment of TDM scheduling in which a grant to transmit on a carrier is given to a user for a certain time period.

An example of such a TDM scheduling is shown in FIG. 6, illustrating another embodiment of an L1 signalling scheme. On the left hand side of the drawing the first portions of carriers C1 and C2, illustrated in FIG. 3 are shown. That is, a schematic view of allocation of UE to the carriers C1 and C2.

On the right hand side, the exemplary L1 signalling performed by the RBS 5A in order to dynamically allocate the UE UE1-UE4 to/from the carriers C1 and C2 in the illustrated manner is shown.

In this embodiment, only the L1 signalling parameters A and C from FIG. 4 are used. In addition, a new L1 signalling parameter F is included when giving grants for transmissions in TDM mode, which parameter indicates the time period for which a grant is given. In this example, the parameter F is an integer stating the number of TDM timeslots T for which a certain grant is given.

To schedule a UE in CDM mode or non-multiplexed mode, the RBS 5A (see FIG. 1) only sends the information C to the UE, stating the rate at which transmission is allowed on the carrier for which the grant is given. Such a grant is valid for an indefinite time period, thus allowing the UE to transmit at the granted rate until it receives a grant for another rate on that carrier. However, to schedule a UE in TDM mode, the RBS 5A sends both the information C stating the granted transmission rate on a carrier and the information F stating the number of TDM timeslots for which the grant is given.

The introduction of the new L1 signalling parameter F eliminates the need of sending Grant=0 to TDM users, thus eliminating the above-described risk of two TDM users transmitting simultaneously at high data rate on a clean carrier due to any failure in the reception of a Grant=0. As seen at the point in time t2 in the L1 signalling scheme, there may still be a need for sending Grant=0 to LDR users in CDM mode upon establishment of a clean carrier. However, a failure in the reception of a Grant=0 by a LDR user is not as critical to the radio environment within the cell as a failure in the reception of a Grant=0 by a HDR user since a HDR user causes much more interference than an LDR user.

As seen at the point in time t3, there may also be a need for sending Grant=0 to a HDR UE (in this case on C2 to UE1) if that UE was first scheduled in non-multiplexed mode on the clean carrier. Therefore, it may be beneficial to always set an expiry time for a grant given on a clean carrier, i.e. to include the parameter F when allocating a HDR UE to a clean carrier even if that particular UE is the only HDR UE within the available carriers at the point in time at which it is allocated to the clean carrier. If this approach was to be used in the scenario illustrated in FIG. 6, UE1 would have received a value also for the L1 signalling parameter F on C2 at the point in time t2. Although advantageous in that this approach would minimize the risk of HDR UE transmitting simultaneous on clean carriers, it is disadvantageous in that it would increase overall L1 signalling.

From the scheme it can be seen that at the point in time $t_2$ (corresponding to $t_b$ in FIG. 3), the RBS 5A has identified UE1 as a HDR UE and therefore determines to dedicate carrier C2 to UE1 for a time to come. Here, in order to dedicate C2 to UE1, i.e. to make UE1 the only UE transmitting on C2, the RBS 5A has to abort the transmissions from UE2, UE3 and UE4 currently taking place on C2. As seen in the L1 signalling scheme this is performed by sending Grant=0 on C2 to all of them. At a point in time ($t_b$ in FIG. 3) preceding $t_3$, UE2 also becomes a HDR UE. Therefore, the RBS 5A dedicates C2 to UE2 between $t_3$ and $t_4$. This is performed by sending a Grant=0 on C2 to UE1 at $t_3$. At the same time $t_3$, the RBS 5B allocates UE2 to C2 where it is scheduled in TDM mode by the RBS 5A by including the parameter F in the L1 signalling to UE2. During the time period in which UE1 and UE2 both are identified as HDR UE ($T_a$ in FIG. 3), they are scheduled in TDM mode on the clean carrier C2. Due to the inclusion of the new L1 signalling parameter F, no Grant=0 need to be transmitted to UE2 at $t_4$ and UE1 at $t_5$ since the grants they received at $t_3$ and $t_4$, respectively, only are valid for one TDM timeslot (F=1), forcing UE1 and UE2 to automatically abort transmission on C2 when the respective timeslot for which they received the grant expires.

In this example, grants are seen to be given only for one TDM timeslot at a time (every time it is transmitted F is set to 1). However, as mentioned above, F can be set to any suitable value. Of course, a given grant period for a carrier may be made expired by sending a grant of 0 Mbps for that carrier but, as mentioned above, this is not a desired solution as it may lead to simultaneous TDM transmissions on the same carrier if the 0 Mbps grant is not properly received by a UE.

Figure 7:
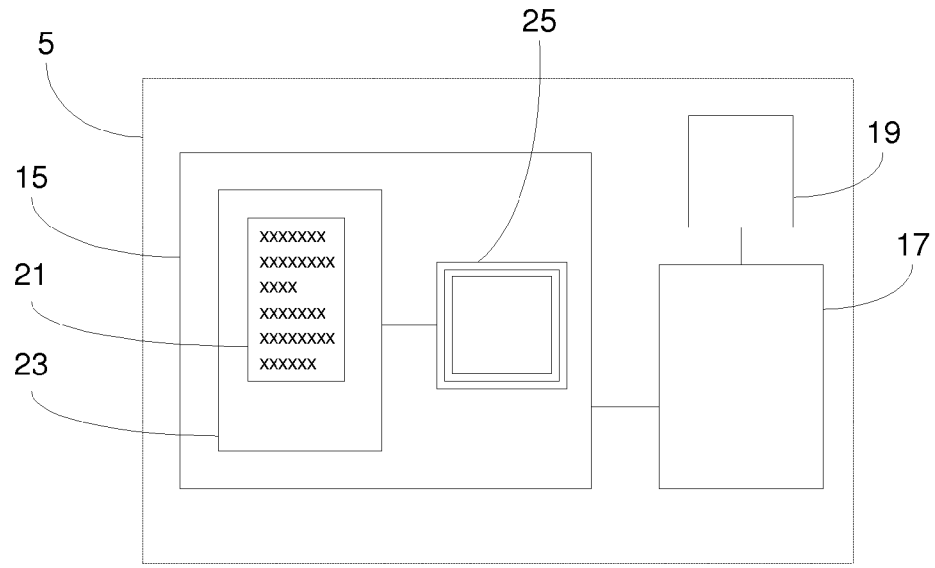
FIG. 7 illustrates a block diagram showing some of the principal parts of a radio base station according to the invention.

It should be appreciated that the L1 signalling scheme illustrated in FIG. 6 could be combined with the L1 signalling scheme in FIG. 4 so that both the cleanCarrierFlag-parameter B and the parameter F indicating the length of each given TDM grant are used in the L1 signalling. Of course, it could also be combined with the above-described concept of excluding L1 signalling from UE at TDM timeout FIG. 7 illustrates a block diagram showing some of the principal parts of an RBS 5 according to the invention, such as the RBSs 5A and 5B illustrated in FIG. 1. The RBS 5 comprises a control unit 15 which is connected to a transceiver module 17 comprising transceiver circuitry for processing signals that are transmitted from/received by the RBS 5 through an antenna module 19. The control unit 15 comprises logic for carrying out and optimizing the dynamic establishment and release of clean carriers and the dynamic allocation of users and/or services to/from the available cell carriers. Typically, this functionality is implemented by means of a software or computer program 21. The RBS 5 may thus comprise storage means 23, such as a conventional hard disk drive or the like, for storing the computer program 21 and processing means 25, such as a microprocessor, for executing the program. The computer program 21 typically uses the RDTRs 9 received from UE 3 as input parameters to various algorithms for determining how the establishment/release of clean carriers and the allocation of UE 3 to the carriers should be performed in order to allow the UE 3 to transmit at the requested rates while at the same time minimizing intra-cell interference. An RBS 5, 5A, 5B according to the invention may hence be adapted to receive the RDTRs 9 from the UE 3 connected thereto and use them as input parameters to a control unit 15 for determining which L1 signalling parameters should be transmitted to the UE 3 in order to allocate the UE to the available cell carriers in an optimal way.

It should be appreciated that the logic of the RNC 7 shown in FIG. 1 can be implemented by using the same or similar components as those illustrated FIG. 7 for implementing the logic of an RBS 5, 5A, 5B. That is, the logic of an RNC 7 may also implemented by means of a control unit comprising a processor running a computer program for determining, e.g., which services are allowed to be transmitted on clean and non-clean carriers, respectively, whether L1 signalling should be allowed by the UE 3 in the network 1 at TDM timeout, etc.

Single carrier (SC) users are not suitable to be scheduled on a potential clean carrier, as the assumption is that they can only be reallocated to another carrier by RRC signalling, which is too slow. However, the clean carrier concept for MC users does not prevent SC users to be allocated on non-clean carriers, and there be working in TDM scheduling mode.

Figure 8:
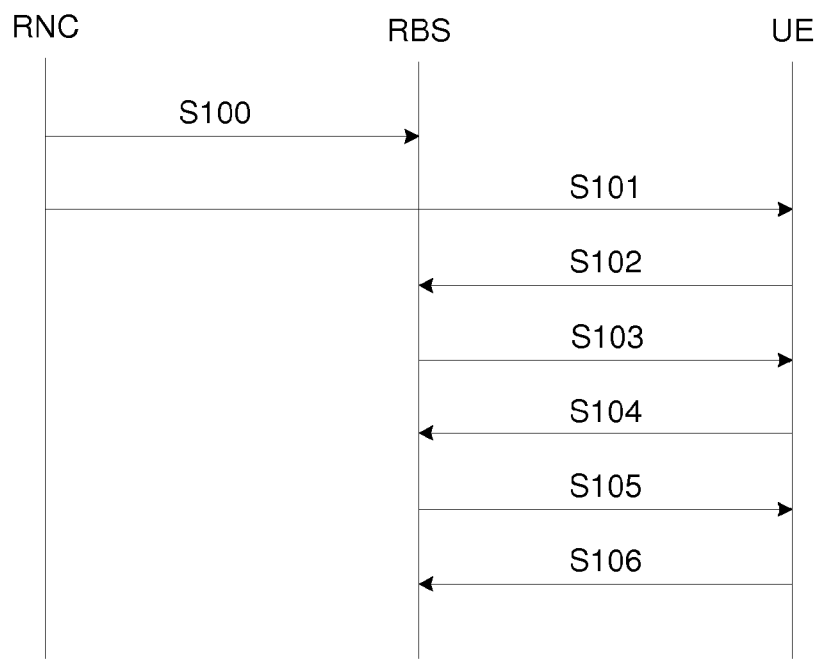
FIG. 8 illustrates a signalling scheme showing how a multicarrier user may be allocated to a clean carrier.

FIG. 8 shows an exemplary sequence when a MC user is allocated to a clean carrier:

Step S100: RNC->RBS: Radio Bearer setup on Multicarrier C1+C2 by NBAP (Node B Application Part) signalling.
Step S101: RNC->UE: Radio bearer setup on Multicarrier C1+C2 by RRC signalling including operating condition for clean carrier.
Step S102: UE->RBS: Request for grant for data transmission by L1 signalling.
Step S103: RBS->UE: Allowed data rate granted per carrier by L1 signalling with cleanCarrierFlag=0 for both carriers.
Step S104: UE->RBS: User data transmitted on both carriers according to received grants.
Step S105: RBS->UE: New grant for C2 by L1 signalling with cleanCarrierFlag=1.
Step S106: UE->RBS: User data transmitted on both carriers according to received grants. C1 is working in CDM mode with unaffected grant. C1 is reconfigured to carry 2 HS-DPCCHs. C2 is working in clean carrier TDM mode with service restriction and TDM operation according to the previous RRC signalling.

Figure 9:
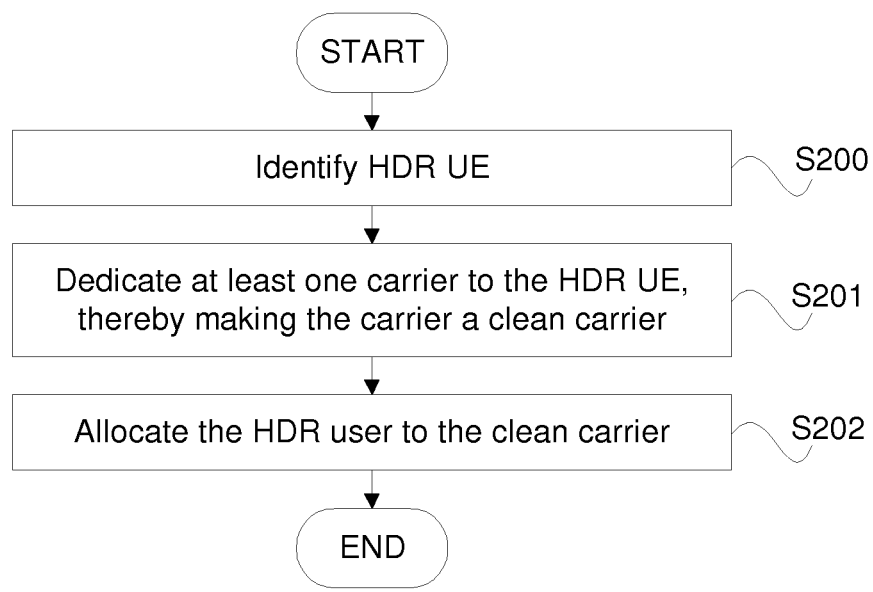
FIG. 9 illustrates a method for reducing interference within a network according to the invention.

FIG. 9 illustrates a method wherein the above described clean-carrier concept is used for allowing HDR UE in a mobile communications network 1 to transmit data at high rates without causing interference towards LDR UE scheduled in CDM mode. The method is intended for use in a network in which UE operating in MC mode, meaning that uplink transmissions from UE to a RBS can be performed on at least two different carriers C1, C2. The UE should support dynamic switching between CDM and TDM transmission mode and the RBS should be adapted to set the mode of transmission for the UE.

In a first step S200, a HDR UE currently requiring high data transmission rate is identified. As previously mentioned, a UE may be identified as a HDR UE based on its current buffer size. For example, the RBS can identify a UE connected thereto as a HDR UE if the data transmission rate requested by that UE exceeds a certain threshold value, which indicates that its current buffer size is large.

In step S201, at least one of said at least two carriers C1, C2 is dedicated to the HDR UE identified in step S200 for at least a first period of time T, meaning that the identified HDR UE is the only UE within the available cell carriers that is allowed to transmit on said at least one carrier during that period of time. This at least one carrier on which only one single HDR UE at a time is allowed to transmit is herein called a clean carrier.

In step S202, the HDR UE is allocated to the at least one clean carrier during said at least first period of time T.

As described above, when a single UE within the available cell carriers is identified as a HDR UE, it can be allocated to a clean carrier for a definite or an indefinite time period. However, when two or more UE are identified as HDR UE and allocated to the same clean carrier, they are scheduled in TDM mode to make sure that only one HDR UE at a time transmits on a clean carrier. Thereby, the communications system functions in accordance with the main principle proposed herein, namely that UE are allowed to transmit at high data rates only on clean carriers (i.e. carriers on which there are no simultaneous CDM transmissions) and only on a one-at-a-time-on-each-carrier basis.

By allocating HDR users to separate carriers, herein called clean carriers, LDR users transmitting on non-clean carriers will not experience any interference caused by HDR users. That is, there is no longer any intra-cell disturbance from HDR users towards LDR users and the stability problem of existing solutions discussed in the background is therefore to a large extent solved. By using the proposed method, much higher noise rise can be allowed within a cell, resulting in a much higher experienced data rate for HDR users. Additionally, for a clean carrier, no interference cancellation (IC) for intra-cell interference reduction is needed, leading to reduced system complexity.

Another advantage achieved by the proposed method is the previously discussed possibility to selectively choose specific services to be allowed on the clean carrier(s), thereby ensuring that data related to high-priority services can be transmitted at high rates without causing intra-cell interference.

Not only does the proposed method provide for reduced interference from HDR users towards LDR users, it also provides for better inter-cell interference control. This is due to the fact that the neighbouring cells of a cell employing the proposed clean-carrier concept will experience fewer HDR users as interferers. This makes it possible for an advanced IC receiver to efficiently reduce the inter-cell interference.

Below, some further aspects of the invention are described:
1. A UE3 for use in a mobile communications network 1 comprising at least one RNC 7 and at least one RBS 5A, 5B, the UE 3 being adapted to transmit signals to the RBS 5A, 5B on at least two different carriers C1, C2, and to support dynamic switching between CDM and TDM transmission mode, the UE 3 being further adapted to:
   receive, from said RNC 7, information D identifying at least one of a plurality of services, said at least one identified service hereinafter being named clean-carrier service;
   receive, from said RBS 5A, 5B, information B indicating that at least one of said at least two carriers C1, C2 is dedicated to said UE 3 for at least a first period of time T, said at least one carrier hereinafter being named clean carrier; and,
   selectively transmit only data related to said at least one clean-carrier service on said clean carrier during said period of time T.
2. UE 3 according to aspect 1, said UE being adapted, when receiving information B identifying a plurality of services as clean-carrier services, to schedule the transmissions of data related to said plurality of clean-carrier services in service priority order, and transmit said data on the clean carrier in said service priority order.
3. UE 3 according to aspect 1 or 2, said UE being adapted for High Speed Dedicated Physical Control Channel (HS-DPCCH) signalling and further adapted to configure all HS-DPCCH channels to a non-clean carrier while transmitting on a clean carrier.
4. UE 3 according to any of the aspects 1 to 3, said UE being adapted to support simultaneous transmission on multiple carrier frequencies C1, C2.
5. A network node 4 in a mobile communications network 1 in which uplink transmissions from UE 3 to an RBS node 5A, 5B can be performed on at least two different carrier frequencies C1, C2, the UE 3 supporting dynamic switching between CDM and TDM transmission mode and the RBS node 5A, 5B being arranged to dynamically set the mode of transmission for said UE 3, the network node 7 being adapted to transmit the following to said UE 3:
   information D identifying at least one of a plurality of services as a clean-carrier service, and
   instructions telling said UE 3 that only data related to the at least one clean-carrier service are allowed to be transmitted on a clean carrier C1, C2 for which said UE 3 receives a grant from an RBS 5A, 5B in said network 1.
6. A network node 5 according to aspect 5, said network node being a Radio Network Controller (RNC) node in a UMTS network.
7. A network node 7 according to aspect 6, said network node being adapted to transmit said information D and instructions to the UE 3 using Radio Resource Control (RRC) signalling at Radio Bearer setup and/or reconfiguration.
8. A method for TDM transmission scheduling in a communications network 1 in which UE 3 start transmitting substantially immediately upon reception of a grant for transmission C received from an RBS 5A, 5B to which they are connected, comprising the step of:
   transmitting from the RBS 5A, 5B to the UE 3, along with each grant for transmission C, information F indicating for how long time each given grant is valid.
9. A UE 3 for use in a communications network 1 in which UE 3 start transmitting substantially immediately upon reception of a grant for transmission received from an RBS 5A, 5B to which they are connected, said UE 3 comprising:
   means for receiving, from said RBS 5A, 5B, a grant for transmission C and information F indicating for how long time said grant for transmission C is valid;
   means for initiating transmission substantially immediately upon reception of said grant for transmission C, and
   means for aborting transmission when the time for which the grant for transmission C was valid has elapsed.
10. An RBS 5A, 5B for use in a communications network 1 in which UE 3 start transmitting substantially immediately upon reception of a grant for transmission received from an RBS 5A, 5B to which they are connected, said RBS 5A, 5B comprising:
    means for transmitting, to a UE 3, a grant for transmission C and information F indicating for how long time the given grant for transmission C is valid.
11. A network node 7, 5A, 5B in a mobile communications network 1 in which UE 3 can transmit signals to RBSs 5A, 5B in TDM transmission mode, the network node 7, 5A, 5B being adapted to transmit information stating whether L1 signalling should be allowed on said carrier at TDM timeout to the UE 3.
12. A UE 3 for use in a mobile communications network 1 in which UE 3 can transmit signals to RBSs 5A, 5B in TDM transmission mode, said UE 3 being adapted to receive, from a node 7, 5A, 5B within the network, information stating whether L1 signalling is allowed at TDM timeout, and, if not, abort both data transmission and L1 signalling at TDM timeout when scheduled in TDM transmission mode.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:
1. A method for reducing interference between users in a mobile communications network in which uplink transmissions from user equipment to a radio base station can be performed on at least two different carriers, the user equipment supporting dynamic switching between code division multiplexing and time division multiplexing transmission modes and the radio base station being arranged to dynamically set the transmission mode for said user equipment, the method comprising;
  identifying at least a first user equipment as a high data rate user equipment currently requiring high data transmission rate;
  dedicating at least one of said at least two carriers to said high data rate user equipment for at least a first period of time, said at least one carrier referred to herein as a clean carrier, and
  allocating said high data rate user equipment to said clean carrier during said at least first period of time, while ensuring that no user equipment operating in code division multiplexing mode is transmitting on the same carrier as said high data rate user equipment during said period of time.

2. The method according to claim 1, wherein a plurality of user equipment are identified as high data rate user equipment, the plurality of user equipment being scheduled in time division multiplexing mode on said clean carrier.

3. The method according to claim 1, further comprising dynamically allocating a plurality of high data rate user equipment to/from said at least one clean carrier.

4. The method according to claim 3, wherein said dynamic allocation of the plurality of high data rate user equipment to/from said at least one clean carrier is performed by means of L1 signalling.

5. The method according to claim 4, wherein said L1 signalling is performed on an enhanced dedicated channel, E-DCH, and/or an absolute grant channel, E-AGCH.

6. The method according to claim 4, wherein said L1 signalling includes information about granted transmission rate for at least one of said at least two different carriers and information indicating whether said at least one carrier is a clean carrier.

7. The method according to claim 1, wherein the clean carrier is dedicated to said high data rate user equipment only for transmissions relating to a particular service.

8. The method according to claim 1, wherein the identification of a user equipment as a high data rate user equipment is performed based on a current buffer size of said user equipment.

9. The method according to claim 8, wherein identifying a high data rate user equipment comprises receiving, at a radio base station, a request for a data transmission rate from a user equipment, which data transmission rate depends on the current buffer size of said user equipment, and identifying said user equipment as a high data rate user equipment if said data transmission rate exceeds a threshold value.

10. A radio base station in a mobile communications network, the radio base station being arranged to receive uplink transmissions from user equipment on at least two different carriers, the user equipment supporting dynamic switching between code division multiplexing and time division multiplexing transmission modes and the radio base station being arranged to dynamically set the transmission mode for said user equipment;
  wherein said radio base station comprises a control unit configured to identify at least a first high data rate user equipment currently requiring high data transmission rate, configured to dedicate at least one of said at least two carriers to said high data rate user equipment for at least a first period of time, said at least one carrier referred to hereinafter as a clean carrier, and configured to allocate said at least first high data rate user equipment to said clean carrier during said at least first period of time, thereby ensuring that no user equipment operating in code division multiplexing mode is transmitting on the same carrier as said high data rate user equipment during said period of time.

11. A radio base station according to claim 10, said control unit further configured to schedule a plurality of user equipment identified as high data rate user equipment in time division multiplexing mode on said clean carrier.

12. A radio base station according to claim 10, wherein the control unit is further configured to dynamically allocate said high data rate user equipment to/from said at least one clean carrier.

13. A radio base station according to claim 12, said radio base station being adapted to use L1 signalling for the dynamic allocation of high data rate user equipment to/from said at least one clean carrier.

14. A radio base station according to claim 13, said radio base station being adapted to perform the L1 signalling on an enhanced dedicated channel, E-DCH, and/or an absolute grant channel, E-AGCH.

15. A radio base station according to claim 13, said radio base station being adapted to include, in said L1 signalling, information about granted transmission rate for at least one of said at least two different carriers and information indicating whether said at least one carrier is a clean carrier.

16. A radio base station according to claim 10, said radio base station being adapted to identify a user equipment as a high data rate user equipment based on a current buffer size of said user equipment.

17. A radio base station according to claim 16, said radio base station being adapted to receive a request for a certain data transmission rate from a user equipment, which data transmission rate depends on the current buffer size of said user equipment, and identify said user equipment as a high data rate user equipment if said data transmission rate exceeds a certain threshold value.

18. An RBS according to claim 10, said radio base station comprising a Node-B in a Universal Mobile Telecommunications System network.

* * * * *

UNITED STATES PATENT AND TRADEMARK OFFICE
CERTIFICATE OF CORRECTION

PATENT NO. : 8,861,436 B2
APPLICATION NO. : 13/000526
DATED : October 14, 2014
INVENTOR(S) : Andersson et al.

It is certified that error appears in the above-identified patent and that said Letters Patent is hereby corrected as shown below:

On the title page, item (75), under "Inventors", in Column 1, Line 3, delete "Ovesjo," and insert -- Ovesjö, --, therefor.

On the title page, item (75), under "Inventors", in Column 1, Line 3, delete "Alvsjo" and insert -- Älvsjö --, therefor.

On the title page, item (75), under "Inventors", in Column 1, Line 4, delete "Alta" and insert -- Älta --, therefor.

On the title page, item (75), under "Inventors", in Column 1, Line 5, delete "Taby" and insert -- Täby --, therefor.

On title page 2, item (56), References Cited under "OTHER PUBLICATIONS", in Column 2, Lines 3-6, delete
"URL:http://74.125.77.132/search?q=cache:3E12_ItsLcUJ:www.quintillio-n.co.jp/3GPP/TSG_RAN/TSG_RAN2008/TSG RAN_WG1_RL1_2.html+tr-25.823+3gpp&cd=1&hl=nl&ct=clnk&gl=nl>." and insert
-- 25.823+3gpp&cd=1&hl=nl&ct=clnk&gl=nl>. --, therefor.

In the Specification

In Column 1, Line 36, delete "1s" and insert -- is --, therefor.

In Column 1, Line 40, delete "1s" and insert -- is --, therefor.

In Column 1, Line 49, delete "1s" and insert -- is --, therefor.

In Column 10, Line 58, delete "($t_b$" and insert -- ($t_c$ --, therefor.

Signed and Sealed this
Twenty-eighth Day of July, 2015

Michelle K. Lee
*Director of the United States Patent and Trademark Office*

CERTIFICATE OF CORRECTION (continued)
U.S. Pat. No. 8,861,436 B2

In the Claims

In Column 15, Line 3, in Claim 1, delete "comprising;" and insert -- comprising: --, therefor.

In Column 16, Line 18, in Claim 11, delete "A radio" and insert -- The radio --, therefor.

In Column 16, Line 22, in Claim 12, delete "A radio" and insert -- The radio --, therefor.

In Column 16, Line 26, in Claim 13, delete "A radio" and insert -- The radio --, therefor.

In Column 16, Line 30, in Claim 14, delete "A radio" and insert -- The radio --, therefor.

In Column 16, Line 34, in Claim 15, delete "A radio" and insert -- The radio --, therefor.

In Column 16, Line 39, in Claim 16, delete "A radio" and insert -- The radio --, therefor.

In Column 16, Line 43, in Claim 17, delete "A radio" and insert -- The radio --, therefor.

In Column 16, Line 50, in Claim 18, delete "An RBS" and insert -- The radio base station --, therefor.